June 3, 1930.  J. E. ESHBAUGH  1,761,909

AMMETER

Filed Oct. 7, 1927

Inventor
Jesse E. Eshbaugh
By Blackmore, Spencer & Hiel
Attorneys

Patented June 3, 1930

1,761,909

UNITED STATES PATENT OFFICE

JESSE E. ESHBAUGH, OF FLINT, MICHIGAN, ASSIGNOR TO A C SPARK PLUG COMPANY, OF FLINT, MICHIGAN, A COMPANY OF MICHIGAN

AMMETER

Application filed October 7, 1927. Serial No. 224,641.

This invention relates to an ammeter and more particularly to an ammeter of the type ordinarily mounted on the dashboard of an automobile to indicate the direction and magnitude of the current through the electrical system.

The prime requisite of an ammeter of this type is simplicity. Economy of production is vital and it is essential that the device be composed of a minimum number of parts. An ammeter of this type is ordinarily mounted in a small aluminum case and includes a conductor, a permanent magnet, an indicating needle which is mounted on a shaft carrying an armature of magnetic material, and a dial for indicating the position of the needle. The conductor is arranged parallel to the line between the poles of the magnet so when a current passes through the conductor, the position of the armature, and hence the needle mounted on the same shaft, will be the resultant of the force of the unvarying permanent magnet and the magnetic flux, the lines of which extend circumferentially about the conductor, this flux varying in magnitude and direction with the current.

It is well known that the intensity of a magnetic field at a point adjacent a conductor varies inversely with the distance from that point to the conductor. Hence, when the first unit of current gives a unit deflection of the armature, it moves the armature some distance from the conductor and into a weaker field. The next unit of current strengthens this field but does not make it strong enough to move the armature the same distance the first unit did. In an ammeter of this type the dial must be graduated with a changing scale or the amount of current will not be accurately indicated.

It is the object of the present invention to so construct and locate the parts that upon rotation of the armature, one side moves to a field of less intensity while the other side moves to a field of greater intensity. This arrangement compensates to a great extent the inaccuracies resulting from the previous constructions and secures a more nearly equal deflection for each additional unit of current.

Other objects of the invention will appear in the course of the following description, taken in connection with the accompanying drawing and appended claims.

Figure 2:
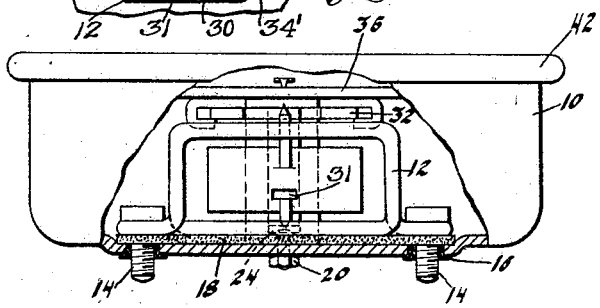
Figure 2 is an end view with part of the case broken away substantially on the line 2—2 of Figure 1.
Figure 3:
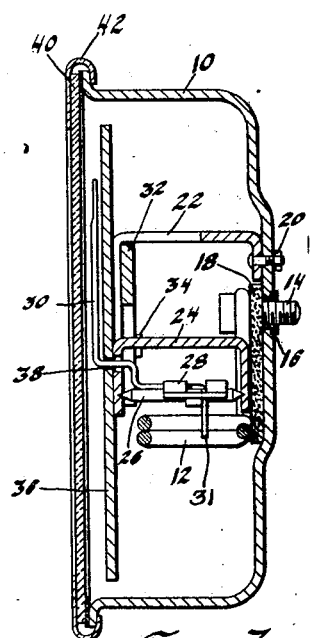
Figure 3 is a section on the line 3—3 of Figure 1.

Referring to the drawing, the numeral 10 indicates a substantially cupshaped case which is flared out at its rim. This case is ordinarily constructed of aluminum. While the device is ordinarily fixed to the dashboard of the car in the position illustrated in Figure 3, for the purposes of the present description I shall refer to the parts according to their position in Figure 2.

The numeral 12 indicates the coil through which the current to be measured flows. While I have shown two loops in the coil, the exact number is immaterial as one may be sufficient or more than one desirable. Terminal bolts 14 pass through the terminals of this coil and through corresponding apertures in the bottom of the case, being held from contact therewith by insulating washers 16. A strip 18 of insulating material is placed between the coil and the bottom of the case.

Fixed to the bottom of the case by means of a bolt or rivet 20 is a one-piece metallic frame 22 which extends upward and has a horizontal portion on which the dial is supported. A central strip from the horizontal and vertical portions of the frame 22 is bent down in the form of a tongue as at 24 and the opposed surfaces prick punched to provide bearings for the cone-shaped ends of the shaft 26 on which are mounted the indicating needle 30 (having a balancing tail 31) and the armature 28, the plane of the latter being parallel to the plane of the coil. The armature is of magnetic metal and is readily held on the shaft by the tension of the metal. By placing the armature as it is, I am enabled to use a greater portion of the magnetic field for deflecting the armature than would be possible if the armature were in a plane perpendicular to the shaft 26. This provides an armature that is responsive to smaller changes in current than would otherwise be the case.

Supported in the bend in the frame 22 is a horseshoe magnet 32 held in place by bent down portions 34 of the frame 22. Riveted to the frame 22 is the dial 36 which is provided with an arcuate slot 38 for permitting swinging of the offset indicating needle 30. At 40 I have indicated the usual glass cover and at 42 the bezel for holding the cover on the case.

Figure 1:
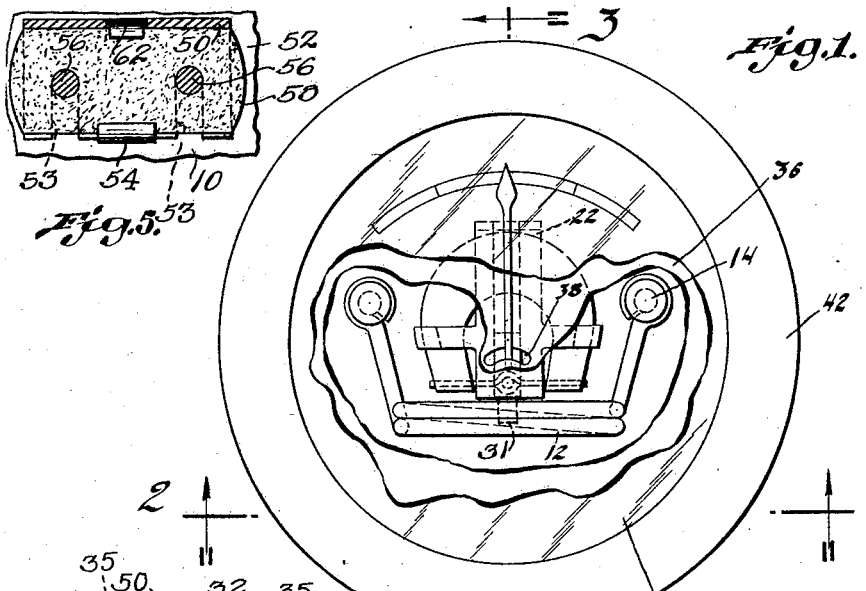
Figure 1 is a plan view with parts broken away.

The operation of the device will now be described. By reference to Figure 1, it is noted that as the armature rotates clockwise, the left side moves away from the short vertical strands of the conductor and hence toward a weaker magnetic field. At the same time the right side of the armature moves for some distance toward the conductor and hence toward the more intense part of the magnetic field.

The permanent magnet normally holds the armature in a fixed position. As current passes through the coil, the magnetic field thereabout tends to turn the armature at right angles to its illustrated position. The position of the armature will be the resultant of the force of the permanent magnet and the force of the magnetic flux about the conductor during passage of the current. As the needle and armature are fixed to the shaft 26, the position of the armature will be indicated by the position of the needle on the dial. The needle thus indicates the direction and magnitude of flow of current through the coil of the conductor.

While I have shown the present ammeter as mounted in a case, it is obvious that it may be mounted in any other desired way as within a separate instrument panel or fixed directly to the dashboard of a car. I have described the relation of the parts as parallel or perpendicular, etc., but it must be understood that these terms are used in a general sense, as no great mathematical accuracy is possible or even necessary.

Figure 5:
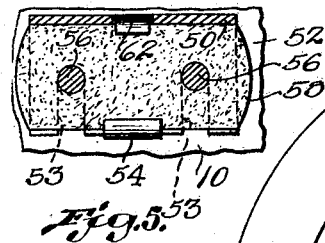
Figure 5 is a section on the line 5—5 of Fig. 4.
Figure 6:
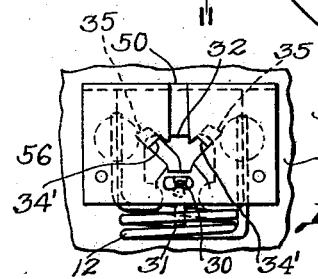
Figure 6 is a section on the line 6—6 of Fig. 4.
Figure 4:
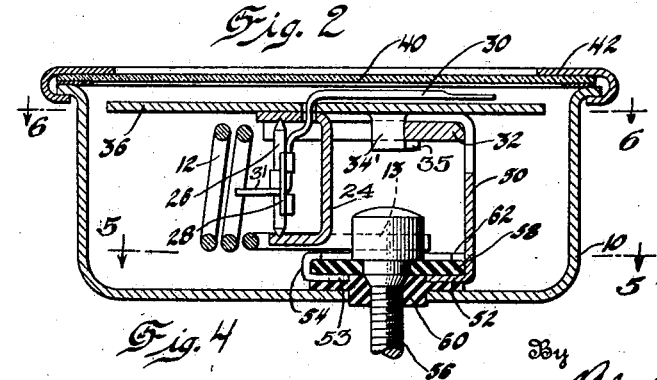
Figure 4 is a sectional view similar to Figure 3 showing a slightly modified form of my invention.

In Figures 4, 5 and 6 I have illustrated a slightly modified form of my invention in which the one piece supporting frame 50 for the dial 36, horseshoe or U-shaped magnet 32, shaft 26, armature 28 and needle 30 is provided with a laterally spaced base portion 52 slotted as at 53 to extend about the terminal bolts 56 and spaced therefrom and from the casing 10 by strips 58 and 60 of insulating material. The base portion 52 is provided with an inturned end 54 and a tab 62 for holding the upper insulating strip 58 in position. The terminals of the conductor 12 are extended as shown in dotted lines at 13 and are connected with the heads of the respective terminal bolts. This structure differs from the first embodiment disclosed in that it renders unnecessary use of the fastening bolt 20. The structure and operation are otherwise the same as that described in the first embodiment described.

In the species shown in Figs. 4, 5 and 6, the magnet 32 is held in place by means of fingers 34', the ends of which are bent away from each other as shown at 35 and grip the magnet at the corners on the inside of its arms. In addition the base portion of the magnet 32 is wedged between the fingers 34' and the back and top portions of the frame 50.

With the described construction shown in Figs. 4, 5 and 6, it is possible to have a sub-assembly consisting of conductor 12, studs 56 and insulator 58, which sub-assembly is rigidly held together by turning over suitable fingers or tabs such as 24, 35, 54 and 62, and may be later dropped into place in the case 10.

It is also to be noted that the lower part of tongue 24 which forms the lower pivot bearing is taken from the inner part of the frame instead of from an extension thereof as is customary in prior constructions. This structure has two advantages; first, it saves metal; second, it permits the conductor 12 to be shoved up closer to the armature without interference.

I claim:

1. In an ammeter, a casing, a one-piece supporting frame, a tongue thereon, a pointer pivotally mounted between said tongue and frame, insulation material on said frame to insulate said frame and mechanism from the casing, and pressed out portions on said frame to rigidly hold said insulation.

2. In an ammeter, a supporting frame having a slotted portion, insulating material above and below said portion, terminals passing through said insulating material and entering said slots, and pressed out portions of said frame retaining a part of said insulating material.

3. The structure of claim 2, a magnet, and pressed out portions on said frame for rigidly holding said magnet to said frame.

4. In an ammeter, a U-shaped one-piece frame, insulation material mounted on one leg of the U, integral tongue or tab portions of said frame rigidly holding said material, an integral tongue formed on said frame and having a portion extending parallel to the legs of the U, a pointer swinging mechanism mounted between said tongue and one of the legs, and a magnet mounted on said frame.

5. The structure of claim 4, said magnet being U-shaped, and integral tongue portions of said frame retaining said magnet at its inner side.

6. The structure of claim 4, said magnet mounted inside the U at one leg and abutting the base of the U.

7. The structure of claim 4, said tongue pressed from a leg and the base of the U.

8. The structure of claim 4, said tongue or tab portions comprising a tongue or tab at the end of a leg of the U, and a tongue or tab pressed from the base of the U.

9. The structure of claim 4, said ammeter having a casing, and said frame secured to said casing at one of said legs by means of terminals passing through the insulation, said leg and the casing.

10. The structure of claim 4, and a dial secured to one leg of said U-shaped frame.

11. In an ammeter, a U-shaped one-piece frame, insulation material mounted on one leg of the U, integral tongue or tab portions of said frame rigidly holding said material, an integral tongue formed on said frame and having a portion extending parallel to the legs of the U, a pointer swinging mechanism mounted between said tongue and one of the legs, one of the legs of the U having an opening to permit passage of the pointer, and a magnet mounted on said frame.

12. In an electrical measuring instrument, a U-shaped frame, a tongue pressed from a leg and the base of the U so as to leave a slot, a pointer swingably mounted between said tongue and one of the legs of the U, a biasing magnet, and tongues pressed from the frame at said slot to hold said magnet.

13. In an ammeter, a U-shaped supporting frame, an integral tongue pressed inwardly of the U from one leg thereof and underlapping said leg, and a pointer-swinging mechanism mounted between said tongue and said leg.

In testimony whereof I affix my signature.

JESSE E. ESHBAUGH.